United States Patent [19]
Lowery, Jr.

[11] Patent Number: 5,993,676
[45] Date of Patent: Nov. 30, 1999

[54] CONTAINER ADAPTER FOR SEPARATING AND DISPENSING LIQUIDS

[76] Inventor: James D. Lowery, Jr., 2525 Latimer Ave., Jackson, Miss. 39209

[21] Appl. No.: 08/950,695

[22] Filed: Oct. 15, 1997

[51] Int. Cl.[6] ................................................ B01D 17/025
[52] U.S. Cl. .......................... 210/800; 210/94; 210/515; 210/518; 210/532.1; 210/533; 210/536; 210/540; 222/129; 220/501; 220/554
[58] Field of Search .................... 210/94, 513, 514, 210/515, 516, 518, 532.1, 533, 534, 538, 539, 540, 800, 536; 222/129; 220/501, 554

[56] References Cited

U.S. PATENT DOCUMENTS

| | | |
|---|---|---|
| 765,091 | 7/1904 | Lourie . |
| 989,865 | 4/1911 | O'Connor . |
| 1,075,576 | 10/1913 | Kadow . |
| 1,085,135 | 1/1914 | Kelly, Jr. . |
| 1,121,270 | 12/1914 | McDermott . |
| 1,121,993 | 12/1914 | Eichler . |
| 1,123,128 | 12/1914 | Kelly, Jr. . |
| 1,396,219 | 11/1921 | Keyes . |
| 4,416,396 | 11/1983 | Ward ........................... 222/129 |
| 4,595,030 | 6/1986 | Yazaki ......................... 210/534 |
| 4,645,097 | 2/1987 | Kaufman ...................... 222/212 |
| 4,881,652 | 11/1989 | Schiemann .................. 222/129 |
| 4,966,312 | 10/1990 | Waring . |
| 4,994,186 | 2/1991 | Hays ............................ 210/515 |
| 5,022,547 | 6/1991 | Spangler ...................... 220/234 |
| 5,197,513 | 3/1993 | Todd et al. ................... 137/592 |
| 5,382,362 | 1/1995 | Lewis, Jr. . |
| 5,453,197 | 9/1995 | Strefling ...................... 210/519 |
| 5,558,257 | 9/1996 | Braun . |
| 5,637,234 | 6/1997 | McCasland .................. 210/519 |
| 5,804,082 | 9/1998 | Lowery, Jr. .................. 210/515 |
| 5,868,946 | 2/1999 | Nguyen ....................... 210/514 |

*Primary Examiner*—Robert J. Popovics
*Attorney, Agent, or Firm*—John F. Sieberth; R. Andrew Patty II

[57] ABSTRACT

A device for adapting a liquid container to enable separation and selective dispensation of two or more immiscible liquids of different densities from the container. The device comprises (a) a first liquid conduit adapted at one end for detachable attachment to the container, whereby the first conduit and the interior of the container may be placed in fluid communication with one another, (b) at least one wall forming a liquid reservoir, the other end of the first conduit opening into the reservoir at a first liquid passage to place the interior of the container in liquid communication with the reservoir, and (c) a second liquid conduit which at one end opens into the reservoir at a second liquid passage and at the other free end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir. Methods of separating and selectively dispensing two or more immiscible liquids of different densities from a container, as well as methods for adapting a container to enable separation and selective dispensation of two or more immiscible liquids of different densities from the container are also disclosed.

20 Claims, 3 Drawing Sheets

CONTAINER ADAPTER FOR SEPARATING AND DISPENSING LIQUIDS

TECHNICAL FIELD

This invention relates to devices which may be used to adapt a container to enable the separation and dispensation of immiscible liquids of different densities from within the container. As used in this specification and the appended claims, "immiscible" with respect to liquids means sufficiently insoluble in each other that they form separate superposed liquid phases, and "liquid" includes both a single compound in liquid form and a homogeneous liquid mixture of different compounds or compositions.

BACKGROUND

Gasoline and other liquid materials are often stored in cans, jugs, tanks and other containers which are sized and configured to enable a user to dispense the liquid from the container when desired. Often, the desired liquid stored in these containers becomes contaminated with undesirable liquids as, for example, when gasoline in a container becomes contaminated with water from condensation or other sources. In other circumstances, a multitude of desired liquids in the same container may be immiscible or may become immiscible over time, and the user may wish to dispense the different liquids separately. In either case, when the liquids are immiscible with respect to one another and have different densities (also commonly referred to as specific gravities), they exist in separate liquid phases. Yet, heretofore containers of such liquids have required the user to dispense at least some of the immiscible liquids of different densities at the same time, or have required substantial dispensation of one phase of liquid before another phase of liquid could be dispensed.

Thus, a need exists for a way to adapt a conventional liquid container to enable separation and selective dispensation from the container of two or more immiscible liquids having different densities, without requiring substantial dispensation of one phase of liquid before another phase of liquid may be dispensed.

SUMMARY OF THE INVENTION

The present invention is deemed to fulfill this need in a highly efficient way by providing, among other things, a device for adapting a liquid container to enable separation and selective dispensation of two or more immiscible liquids of different densities from the container. The device comprises:

a) a first liquid conduit adapted at one end for detachable attachment to the container, whereby the first conduit and the interior of the container may be placed in fluid communication with one another, b) at least one wall forming a liquid reservoir, the other end of the first conduit opening into the reservoir at a first liquid passage to place the interior of the container in liquid communication with the reservoir, and c) a second liquid conduit which at one end opens into the reservoir at a second liquid passage and at the other free end opens to an exterior of the container, thereby placing the reservoir in liquid communication with the exterior.

The first and second liquid passages are spaced apart from one another and disposed relative to the reservoir such that liquids from the container can form separate phases in the reservoir when dispensed from the container and through the first conduit and the liquid(s) of lesser density or densities may be dispensed from the reservoir through the second liquid passage while the liquid(s) of greater density or densities remain in the reservoir. Preferably, the wall forming the liquid reservoir also forms an aperture through which the liquid(s) of greater density or densities may be controllably dispensed from the reservoir. More preferably, the device of this invention further comprise a valve for controlling the flow of liquid through the aperture. The wall forming the reservoir preferably is sufficiently translucent to permit visual detection of the point at which different liquid phases of different colors within the reservoir meet one another. In this way, a user of the device may determine the relative amount of liquids in the reservoir to control which liquid phase(s) flow out of the second liquid passage and, in preferred embodiments, out of the aperture in the wall of the reservoir.

This invention also provides an improvement in liquid containers which may contain two or more immiscible liquids of different densities. The improvement comprises:

a) a first liquid conduit attached to or integral with the container, whereby the first conduit and the interior of the container are in fluid communication with one another, b) at least one wall forming a liquid reservoir, the other end of the first conduit opening into the reservoir at a first liquid passage to place the interior of the container in liquid communication with the reservoir, and c) a second liquid conduit which at one end opens into the reservoir at a second liquid passage and at the other free end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir.

A method of separating and selective dispensing two or more immiscible liquids of different densities from a container is also provided by this invention. The method comprises flowing from the container at least two of the immiscible liquids of different densities through a first conduit directly into a reservoir attached to the container in which the liquids form upper and lower separate superposed liquid phases, and dispensing at least a portion of the upper liquid phase(s) of lesser density or densities from the reservoir while concurrently retaining the lower liquid phase(s) of greater density or densities in the reservoir. The reservoir may be directly or indirectly attached to the container as, for example, when the reservoir is connected to the first conduit which in turn is connected to the container. Preferably, this method further comprises dispensing at least a portion of the lower liquid phase(s) of greater density or densities from the reservoir. In this way, one may select a phase of liquid for dispensation from among the multiple immiscible liquids which flow from the container and into the reservoir.

These and other embodiments and features of the invention will become still further apparent from the ensuing description, appended claims and accompanying drawings.

BRIEF DESCRIPTION OF THE DRAWINGS

In each of the above figures, like numerals are used to refer to like or functionally like parts among the several figures.

DETAILED DESCRIPTION OF THE INVENTION

As may now be seen, this invention provides a highly efficient device and method for selective dispensing immiscible fluids of different densities from the same liquid container. The invention also enables the easy removal of immiscible contaminate or undesired fluids from desired fluids.

Figure 1:
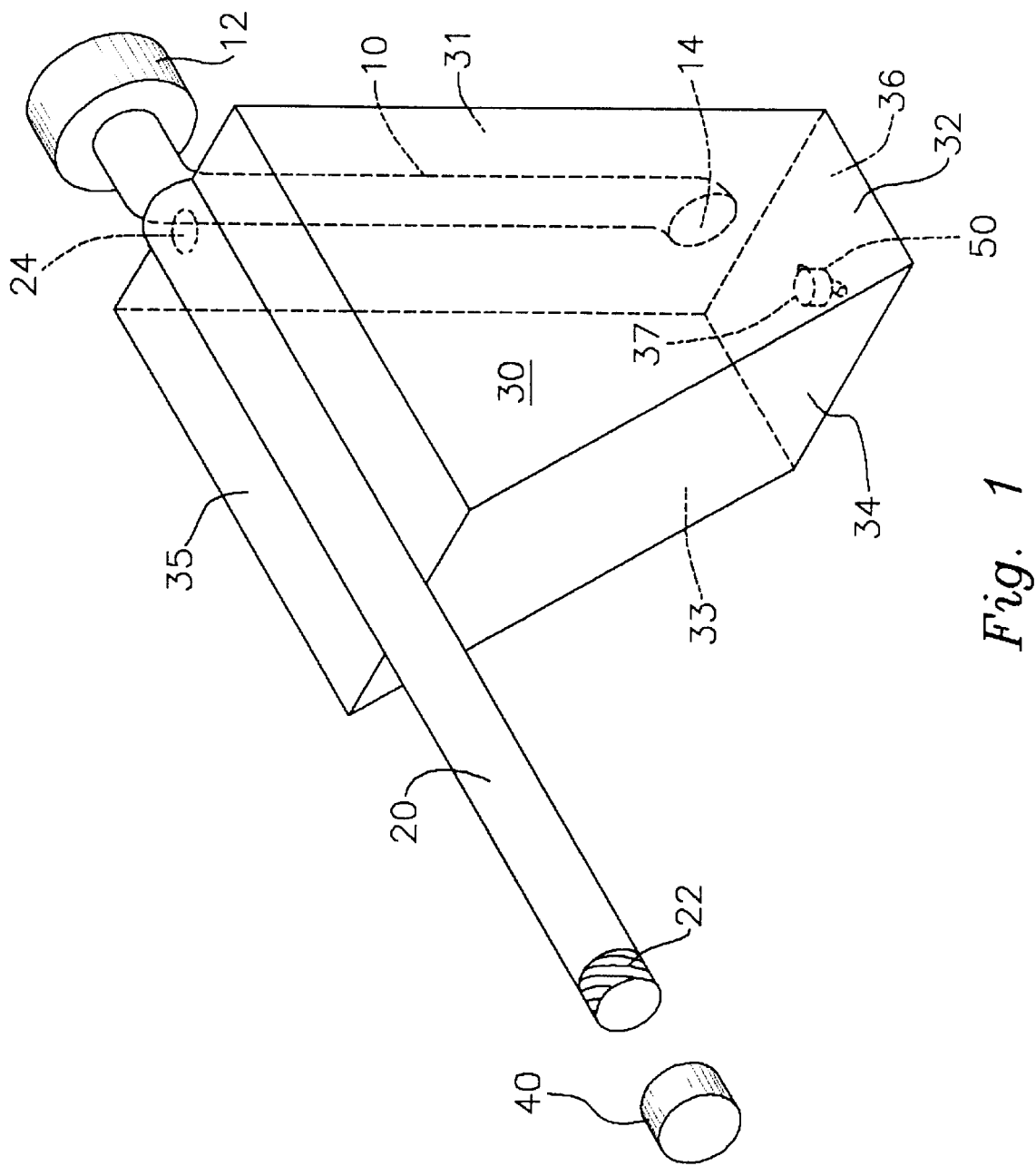
FIG. 1 is an elevated perspective view in phantom of a preferred embodiment of this invention.
Figure 2:
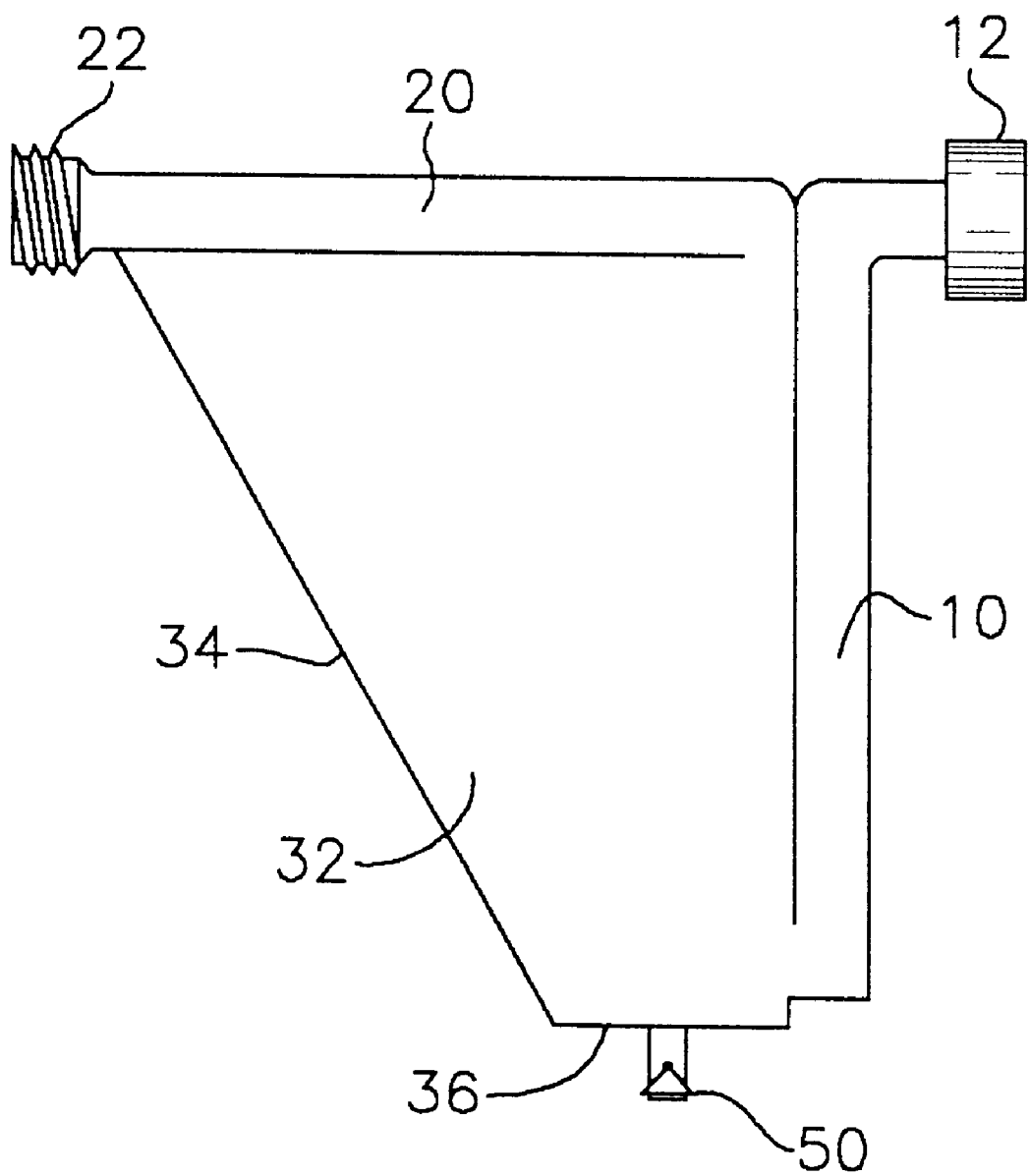
FIG. 2 is a side view of another preferred embodiment of this invention.
Figure 3:
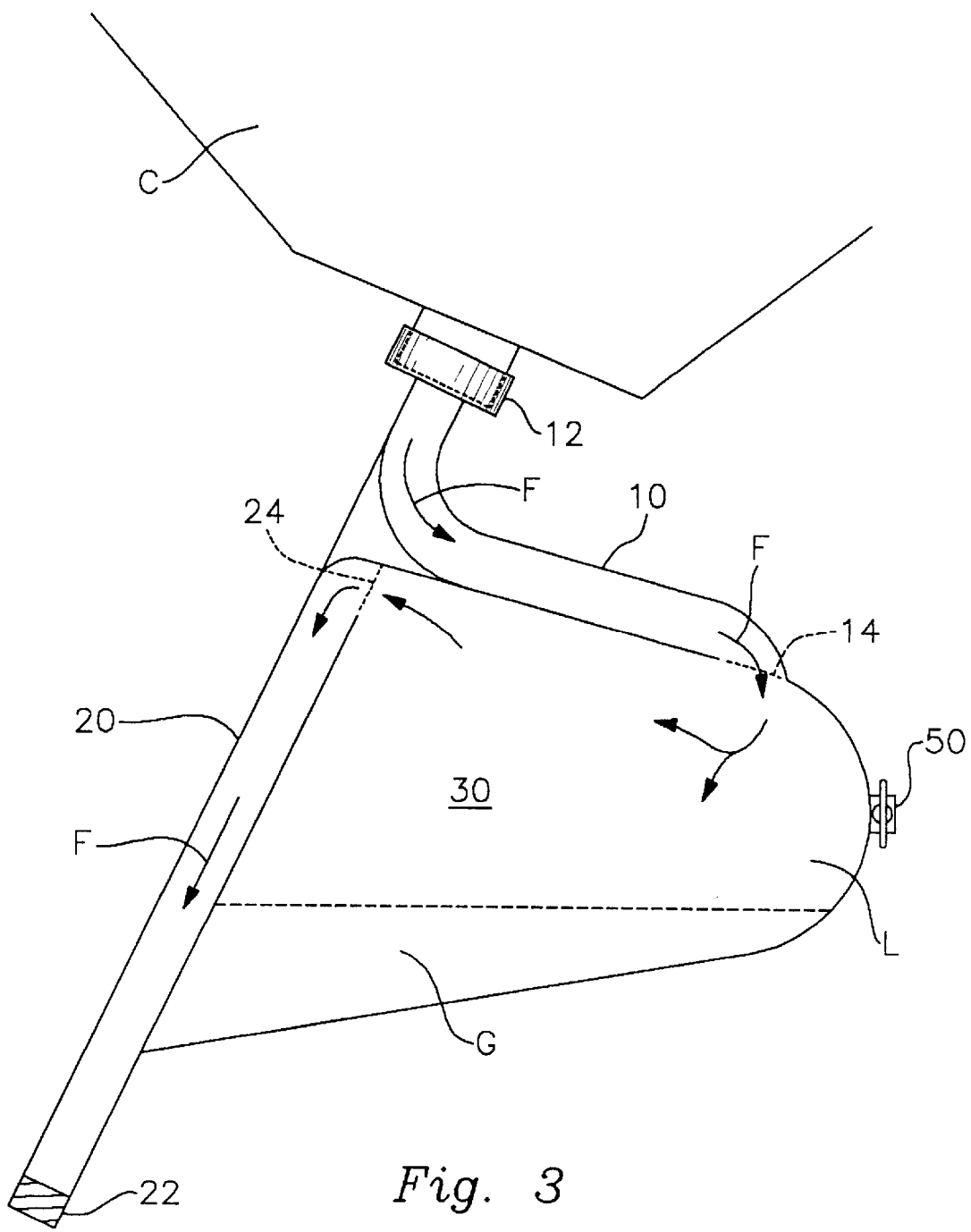
FIG. 3 is a side view illustrating the direction of liquid flow through the device of FIG. 1 while the device is attached to a liquid container.

Referring now to the figures, FIG. 1 illustrates a preferred embodiment of this invention which comprises a first liquid conduit 10, a second liquid conduit 20, and a reservoir 30. A connecting end 12 of first conduit 10 is threaded on its interior surface (not shown) and otherwise configured to receive a correspondingly threaded spout or rim about the outlet of a liquid container C (FIG. 3 only). The other end of first conduit 10 opens into reservoir 30 at a first liquid passage 14. As depicted, reservoir 30 is defined by six walls 31, 32, 33, 34, 35 and 36. Of course, it will be understood that reservoir 30 may be defined by one or more walls, depending upon the desired geometric shape, a substantially spherical shape being considered to have one wall. The number of walls or geometric shape employed is not a limitation of this invention. The device further comprises a threaded cap 40 which may be received by a free end 22 of second conduit 20, free end 22 being correspondingly threaded on its outer surface. The other end of second conduit 20 opens into reservoir 30 at a second liquid passage 24. Wall 36 includes an aperture 37 therethrough, in which a valve 50 (FIGS. 2 and 3 only) is disposed for controllable dispensation of fluid from reservoir 30.

Generally speaking, the dimensions of the various components of the device of this invention are not critical, and may vary widely depending upon the particular application to which the device will be put. For example, with reference to FIG. 1, if desired, the device could be modified so that the length of conduit 10 is reduced and connecting end 12 would be proximate to first passage 14. The preferred embodiment depicted, however, enables first conduit 10 to inhibit the return of liquids from reservoir 30 back into container C when container C is in an upright position. In this regard, the device as depicted in FIGS. 1 and 2 approximate the position of the device when container C is in an upright position. It should be noted, however, as may be seen from FIG. 3 first passage 14 and second passage 24 are spaced apart from one another and disposed relative to reservoir 30 so that, while the device is in the position of normal dispensation of fluids from the container through the device, second passage 24 is above first passage 14 and is at or above the bottom of the top liquid phase in reservoir 30. Liquids flowing into reservoir 30 from container C will flow along flow lines F to form the separate liquid phases in reservoir 30, thereby permitting the liquid(s) of lesser density or densities (liquid phase L on FIG. 3) to be dispensed from reservoir 30 through second liquid passage 24 while the liquid(s) of greater density or densities (liquid phase G on FIG. 3) remain in reservoir 30. When the top of liquid phase G approaches second passage 24, liquid phase G may be removed or lowered, preferably while the container is in an upright position, by opening valve 50 to permit the liquid(s) in liquid phase G to flow through aperture 37 (FIG. 1 only). Thus, aperture 37 preferably is disposed in the wall of the reservoir so that liquid(s) of greater density or densities may flow by gravity through aperture 37 under such circumstances. In addition, while this invention is not limited to one particular theory or another, it is believed that the greater the rate of flow of liquids through the device, the greater should be the size of the reservoir and distance between the first and second passages, thereby facilitating phase formation by the liquids once they have entered the reservoir.

In another preferred embodiment depicted in FIG. 2, free end 22 is not only threaded, but is enlarged in its circumference about its longitudinal axis to correspond to the size and threading of the rim about the liquid outlet aperture of container C. In this way, the same cap (and spout, if desired) which accompanies container C may be used to cap free end 22 when the device is installed on container C. Of course, it is to be understood that each of the devices depicted in these figures may also be rigidly attached to or integral with container C, to provide a single unitary design for a container which permits separation and controlled, selective dispensation of immiscible fluids of different densities from the container.

The device of this invention may be fabricated from a variety of materials including, for example, glass, plastics, metals and metal alloys, as long as the material is not readily reactive or otherwise incompatible with the liquids being dispensed. However, plastic materials are preferred, plastic materials which are sufficiently translucent being more preferred and transparent plastic materials being most preferred. A plastic material is sufficiently translucent if it permits visual detection of the point at which different liquid phases of different colors within the reservoir meet one another. It also is particularly preferred that the walls which define the reservoir be made of sufficiently translucent or transparent material. Of course, the cap or plug which cooperates with the free end of the second liquid conduit of devices of this invention may take the form of a number of different devices. Examples of suitable caps or plugs include threaded caps, cylindrical plugs, spring clamps, vice clamps, valves, capped spouts, and the like. Both the aperture and the conduits of this invention may have caps, spouts, valves and/or other plugs for controlling the flow of fluids therethrough. The conduits of the devices of this invention may comprise hollow tubes or the like attached to the wall(s) forming the reservoir or may comprise other hollow pathways formed from structures which are internal to or integral with the wall(s) which form the reservoir.

As will be understood by those of skill in the art, if necessary, the devices and methods of this invention may facilitate the separation and selective dispensation of more than two fluids where each liquid forms a separate visually distinguishable phase in the reservoir. For example, if three phases form within the reservoir, each phase may be dispensed sequentially, or the bottom and top phases may be dispensed from the reservoir leaving the middle phase in the device, or the bottom or top phase may be dispensed leaving the other two phases in the device. Thus, while the devices and methods of this invention are particularly suited to two-phase liquid separations and dispensations, they may also be used to effect separation and dispensation of three or more immiscible liquids which have different densities. Of course, relative amounts of the different immiscible liquids can affect the manner in which the device may be put to use in separating and dispensing, and different dimensions of the reservoir and the placement of the first and second liquid passages may also play a role in affecting the manner in which the devices may be used or the methods carried out. Another feature of the present invention is provided in that it permits the filtering of solid materials from the desired liquid being dispensed from the container, as long as the solid material is of greater density as compared with, and substantially insoluble in, the desired liquid and is of a small enough particle size to enter and exit the reservoir.

Another method of this invention provides an easy way to remove undesired liquids from a liquid container containing immiscible liquids of different densities. The liquid phase of greater density or densities may be trapped in reservoir 30 by plugging free end 22 and placing container C in a pouring position so that liquid of greater density or densities flows from container C into reservoir 30. When the liquid of greater density or densities has been collected in reservoir 30, container C may be returned to an upright (nonpouring) position and valve 50 opened until the liquid of greater density or densities is dispensed from reservoir 30. If the volume of liquid of greater density or densities requires it, this process may be repeated until the liquid of greater density or densities is substantially removed from container C. The device may then be removed from container C to permit normal dispensation of liquid therefrom, or the plug may be removed from the device and liquid dispensed from container C through the device. Any remaining liquid of greater density or densities will again be trapped within reservoir 30, from which it may be dispensed through valve 50.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A device for adapting a liquid container to enable separation and selective dispensation of two or more immiscible liquids of different densities from the container, the device comprising:
    a) a first liquid conduit adapted at one end for detachable attachment to the container, whereby the first conduit and the interior of the container may be placed in fluid communication with one another,
    b) at least one wall forming a liquid reservoir, the other end of the first conduit opening into the reservoir at a first liquid passage to place the interior of the container in liquid communication with the reservoir, the wall being sufficiently translucent to permit visual detection of the point at which different liquid phases of different colors within the reservoir meet one another, and
    c) a second liquid conduit which at one end opens into the reservoir at a second liquid passage and at the other end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir.

2. A device according to claim 1 wherein the wall forming the liquid reservoir also forms an aperture through which the liquid(s) of greater density or densities may be controllably dispensed from the reservoir.

3. A method of adapting a liquid container to enable separation and selective dispensation of two or more immiscible liquids of different densities from the container, the method comprising attaching to the container a device according to claim 2 so that the interior of the container is placed in fluid communication with the device.

4. A method of separating and selective dispensing two or more immiscible liquids of different densities from a container, the method comprising attaching to the container a device according to claim 2 whereby the interior of the container is placed in fluid communication with the device, and positioning the container so that at least one of the liquids is dispensed from the container through the device.

5. A device according to claim 2 further comprising a valve for controlling the flow of liquid through the aperture.

6. A method of adapting a liquid container to enable separation and selective dispensation of two or more immiscible liquids of different densities from the container, the method comprising attaching to the container a device according to claim 5 so that the interior of the container is placed in fluid communication with the device.

7. A method of separating and selective dispensing two or more immiscible liquids of different densities from a container, the method comprising attaching to the container a device according to claim 5 whereby the interior of the container is placed in fluid communication with the device, and positioning the container so that at least one of the liquids is dispensed from the container through the device.

8. A device according to claim 1 wherein the end of the second conduit which opens to an exterior of the container is configured to receive a cap or plug to prevent liquid from flowing therethrough.

9. A method of adapting a liquid container to enable separation and selective dispensation of two or more immiscible liquids of different densities from the container, the method comprising attaching to the container a device according to claim 1 so that the interior of the container is placed in fluid communication with the device.

10. A method of separating and selective dispensing two or more immiscible liquids of different densities from a container, the method comprising attaching to the container a device according to claim 1 whereby the interior of the container is placed in fluid communication with the device, and positioning the container so that at least one of the liquids is dispensed from the container through the device.

11. In a liquid container which may contain two or more immiscible liquids of different densities, the improvement which comprises:
    a) a first liquid conduit attached to or integral with the container, whereby the first conduit and the interior of the container are in fluid communication with one another,
    b) at least one wall forming a liquid reservoir, an end of the first conduit opening into the reservoir at a first liquid passage to place the interior of the container in liquid communication with the reservoir, the wall being sufficiently translucent to permit visual detection of the point at which different liquid phases of different colors within the reservoir meet one another, and
    c) a second liquid conduit which at one end opens into the reservoir at a second liquid passage and at the other end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir.

12. The improvement of claim 11 wherein the wall forming the liquid reservoir also forms an aperture through which the liquid(s) of greater density or densities may be controllably dispensed from the reservoir.

13. The improvement of claim 12 further comprising a valve for controlling the flow of liquid through the aperture.

14. The improvement of claim 11 wherein the end of the second conduit which opens to an exterior of the container is configured to receive a cap or plug to prevent liquid from flowing therethrough.

15. A method of separating and selective dispensing two or more immiscible liquids of different densities from a container, the method comprising flowing from the container at least two of the immiscible liquids of different densities through a first conduit directly into a reservoir which is attached to the container and in which the liquids form upper and lower separate superposed liquid phases, and dispensing at least a portion of the upper liquid phase(s) of lesser density or densities from the reservoir while concurrently retaining the lower liquid phase(s) of greater density or densities in the reservoir.

16. A method according to claim 15 further comprising dispensing at least a portion of the lower liquid phase(s) of greater density or densities from the reservoir.

17. A device for adapting a liquid container to enable separation and selective dispensation of two or more immiscible liquids of different densities from the container, the device comprising:

a) a first liquid conduit adapted at one end for detachable attachment to the container, whereby the first conduit and the interior of the container may be placed in fluid communication with one another, b) at least one wall forming a liquid reservoir, the other end of the first conduit opening into the reservoir at a first liquid passage to place the interior of the container in liquid communication with the reservoir, the wall also forming an aperture through which the liquid(s) of greater density or densities are controllably dispensed from the reservoir by way of a valve, and c) a second liquid conduit which at one end opens into the reservoir at a second liquid passage and at the other end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir.

18. A device according to claim 17 wherein the end of the second conduit which opens to an exterior of the container is configured to receive a cap or plug to prevent liquid from flowing therethrough.

19. In a liquid container which may contain two or more immiscible liquids of different densities, the improvement which comprises:

a) a first liquid conduit attached to or integral with the container, whereby the first conduit and the interior of the container are in fluid communication with one another, b) at least one wall forming a liquid reservoir, an end of the first conduit opening into the reservoir at a first liquid passage to place the interior of the container in liquid communication with the reservoir, the wall also forming an aperture through which the liquid(s) of greater density or densities are controllably dispensed from the reservoir by way of a valve, and c) a second liquid conduit which at one end opens into the reservoir at a second liquid passage and at the other end opens to an exterior of the container, thereby placing the reservoir in liquid communication with the exterior, wherein the first and second liquid passages are spaced apart from one another and disposed relative to the reservoir such that liquids from the container can form separate phases in the reservoir when dispensed from the container and through the first conduit and the liquid(s) of lesser density or densities can be dispensed from the reservoir through the second liquid passage while the liquid(s) of greater density or densities remain in the reservoir.

20. A device according to claim 19 wherein the end of the second conduit which opens to an exterior of the container is configured to receive a cap or plug to prevent liquid from flowing therethrough.

* * * * *